(12) United States Patent
Mukai et al.

(10) Patent No.: US 7,556,875 B2
(45) Date of Patent: Jul. 7, 2009

(54) FUEL CELL POWER GENERATION SYSTEM INCLUDING AN OFF-GAS HEATING HEAT EXCHANGER USED TO HEAT ANODE STREAM OFF-GAS CONTAINING HYDROGEN

(75) Inventors: Yuji Mukai, Osaka (JP); Kunihiro Ukai, Nara (JP); Akira Maenishi, Osaka (JP); Tomonori Asou, Nara (JP); Yutaka Yoshida, Mie (JP)

(73) Assignee: Panasonic Corporation, Osaka (JP)

( * ) Notice: Subject to any disclaimer, the term of this patent is extended or adjusted under 35 U.S.C. 154(b) by 609 days.

(21) Appl. No.: 10/891,320

(22) Filed: Jul. 14, 2004

(65) Prior Publication Data

US 2005/0053806 A1 Mar. 10, 2005

(30) Foreign Application Priority Data

Jul. 15, 2003 (JP) ............................. 2003-274693

(51) Int. Cl.
*H01M 8/00* (2006.01)
*F23C 11/04* (2006.01)

(52) U.S. Cl. .......................................... 429/26; 429/12

(58) Field of Classification Search ................... 429/12, 429/26
See application file for complete search history.

(56) References Cited

U.S. PATENT DOCUMENTS 5,360,679 A * 11/1994 Buswell et al. ............... 429/19

6,572,994 B1 * 6/2003 Shimotori et al. ............. 429/26
2003/0138688 A1 * 7/2003 Hattori et al. ................. 429/34
2004/0043266 A1 * 3/2004 Oma et al. .................... 429/26

FOREIGN PATENT DOCUMENTS

| JP | 2000178004 A | * | 6/2000 |
|---|---|---|---|
| JP | 2001201046 A | * | 7/2001 |
| JP | 2001-229952 A | | 8/2001 |
| WO | 02/23661 A1 | | 3/2002 |
| WO | WO 0223661 | * | 3/2002 |

OTHER PUBLICATIONS

S.F. Au et al.;The Influence of Operating Temperature on the Efficiency of a Combined Heat and Power Fuel Cell Plant; Journal of Power Sources; 122, pp. 37-46 (2003).

* cited by examiner

*Primary Examiner*—Mark Ruthkosky
*Assistant Examiner*—Karie O'Neill
(74) *Attorney, Agent, or Firm*—Panitch Schwarze Belisario & Nadel LLP

(57) ABSTRACT

A fuel cell power generation system includes a reforming catalyst body configured to generate a reformed gas containing hydrogen from a feed gas and water, a fuel cell configured to generate electric power by consuming the reformed gas, and a burner configured to combust an off gas containing hydrogen from the fuel cell as a fuel gas to generate the combustion gas used for heating the reforming catalyst body. The off gas from which steam has been separated is heated, and the heated off gas is fed to the burner as the fuel gas, the separated steam being condensed into water which is discharged outside the system.

11 Claims, 7 Drawing Sheets

FUEL CELL POWER GENERATION SYSTEM INCLUDING AN OFF-GAS HEATING HEAT EXCHANGER USED TO HEAT ANODE STREAM OFF-GAS CONTAINING HYDROGEN

BACKGROUND OF THE INVENTION

The present invention relates to a fuel cell power generation system configured to generate electric power using a reformed gas containing hydrogen.

A hydrogen generator mainly comprises a reforming catalyst body filled with a reforming catalyst that generates a reformed gas containing hydrogen through steam reforming reaction from a feed gas (hydrocarbon) and water, a burner that generates the combustion gas used for heating the reforming catalyst body by heat exchange, and a CO reducing device that removes carbon monoxide contained in the reformed gas generated by the reforming catalyst body.

The reformed gas from which carbon monoxide has been removed by the CO reducing device is supplied to an anode of a fuel cell. The fuel cell consumes the reformed gas (hydrogen) to generate electric power.

As a fuel gas to be fed to the burner that generates the combustion gas, an off gas is used containing hydrogen remaining unconsumed within the fuel cell and discharged from the fuel cell.

The off gas typically contains saturated steam in addition to the remaining hydrogen. For this reason, the passage through which the off gas flows between the fuel cell and the burner is thermally insulated, thereby inhibiting, as much as possible, the steam contained in the off gas from condensing into water.

However, regardless of thermal insulation of the passage of the off gas, the temperature of the off gas is, for example, about 70 to 80° C., which is higher than that of ambient air. Therefore, the off gas unavoidably radiates heat to the ambient air. Consequently, part of the saturated steam inevitably condenses. The resulting fine water droplets flow within the off gas and are guided to the burner along with the off gas.

If the water droplets flow into the burner, calories corresponding to the latent heat of evaporation used to evaporate the water droplets are consumed by the burner. This results in reduced thermal efficiency in the hydrogen generator. In addition, since combustion of the fuel gas in the burner tends to become unstable because of the existence of the water droplets, there is a possibility that the flame of the burner vanishes.

Accordingly, Japanese Laid-Open Patent Application Publication No. 2001-229952 discloses a fuel cell power generation system including a hydrogen generator capable of stable combustion in a burner by inhibiting entry of water droplets flowing within the off gas into the burner (combustor).

Since this fuel cell power generation system is configured to cool a high-temperature off gas containing steam before the off gas is supplied to the burner, condensation and separation of the steam contained in the off gas is facilitated before the off gas is supplied to the burner, thus inhibiting combustion in the burner from becoming unstable.

However, in the fuel cell power generation system disclosed in the above Publication No. 2001-229952, it is difficult to completely remove fine water droplets generated in a heat exchanger (off gas cooler). The off gas that has passed through the heat exchanger is still saturated with steam, which condenses at a temperature after cooling. Consequently, when the temperature of the off gas flowing within the passage between the heat exchanger and the burner decreases due to, for example, heat radiation from the off gas to ambient air, the saturated steam condenses to form water droplets.

BRIEF SUMMARY OF THE INVENTION

The present invention has been developed under the above circumstances, and an object of the present invention is to provide a fuel cell power generation system configured to appropriately separate and remove steam from an off gas to thereby inhibit formation of water droplets in the off gas supplied to the burner.

In order to solve the above-described problem, according to the present invention, there is provided a fuel cell power generation system comprising a reforming catalyst body configured to generate a reformed gas containing hydrogen from a feed gas and water, a fuel cell configured to generate electric power by consuming the reformed gas, and a burner configured to combust an off gas containing hydrogen from the fuel cell as a fuel gas to generate the combustion gas used for heating the reforming catalyst body, wherein the off gas from which steam has been separated is heated, and the heated off gas is fed to the burner as the fuel gas, the separated steam being condensed into water which is discharged outside the system.

More specifically, a fuel cell power generation system comprises a reforming catalyst body configured to generate a reformed gas containing hydrogen from a feed gas and water, a fuel cell configured to generate electric power by consuming the reformed gas, a water separator configured to separate steam from an off gas containing hydrogen from the fuel cell and to condense the separated steam into water which is discharged outside of system, and a first heat exchanger (heater) configured to heat the off gas from the water separator by heat exchange, and a burner configured to combust the off gas heated by the first heat exchanger to generate the combustion gas used for heating the reforming catalyst body.

The fuel cell power generation system may further comprise a second heat exchanger (cooler) configured to cool the off gas by heat exchange, wherein the steam is separated by cooling the off gas in the second heat exchanger.

Since the off gas from which the steam has been appropriately separated by the water separator is heated by heat exchange in the heater, fine water droplets flowing along with the off gas can be reliably removed.

In this manner, it is possible to achieve a fuel cell power generation system that can appropriately deal with the prior art problem that the water droplets flowing along with the off gas causes unstable combustion of the fuel gas in the burner.

The off gas which has passed through the first heat exchanger and is flowing toward the burner may be heated to a temperature higher than the temperature of the off gas existing at a point located upstream of the first heat exchanger and downstream of the water separator in a flow of the off gas.

Since the off gas is heated by the heater to a temperature higher than the dew point, it is possible to appropriately inhibit the off gas that has passed through the heater and is flowing through the fuel pipe from decreasing to less than the dew point while being guided from the heater toward the burner.

The off gas may be cooled in the second heat exchanger by heat exchange with at least one cooling medium selected from the feed gas, the water, and fuel cell cooling water.

In one embodiment the water separator may include a tubular tank that stores condensed water obtained by separating steam from the off gas, wherein the off gas flowing within the tank is cooled by contact with an outer peripheral surface of the tank which is cooled by the second heat exchanger.

In another embodiment, the water separator may include a tubular tank that stores condensed water obtained by separating steam from the off gas, wherein a pipe filled with a cooling medium to serve as the second heat exchanger is disposed in the passage within the tank through which the off gas flows.

The first heat exchanger may be configured to heat the off gas by heat exchange with the combustion gas. This simplifies the construction of the first heat exchanger.

In an embodiment of the first heat exchanger configured to exchange heat with the combustion gas, a feed pipe through which the off gas is fed to the burner may be located within the passage through which the combustion gas generated by the heater flows to allow the off gas to exchange heat with the combustion gas within the passage.

In another embodiment of the first heat exchanger, the system may further comprise a heat insulator configured to cover the passage through which the combustion gas generated by the burner flows, wherein the feed pipe of the off gas is located within the heat insulator to allow the off gas to exchange heat with the combustion gas within the heat insulator.

In a further embodiment of the first heat exchanger, the feed pipe of the off gas may be provided in contact with a wall portion forming the burner, and the off gas exchanges heat with the combustion gas in a portion where the feed pipe is in contact with the wall portion.

In the above system, a flame rod configured to detect a combustion state of the burner is suitably used. Since the water droplets of the off gas are evaporated in this system, the flame rod is capable of detecting a current without reducing detection precision.

Also, the condensed water obtained by removing the steam from the off gas may be supplied to the reforming catalyst body.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings schematic representation of embodiments which are presently preferred. It should be understood, however, that the invention is not limited to the precise arrangements and instrumentalities shown. In the drawings.

DETAILED DESCRIPTION OF THE INVENTION

Preferred embodiments of a fuel cell power generation system of the present invention are characterized in that condensation and separation of steam contained in an off gas containing remaining hydrogen from a fuel cell is facilitated by cooling the off gas, so that the condensed water is discharged outside the system, and the off gas from which the steam has been separated is heated to a temperature sufficiently higher than the dew point to allow fine water droplets which would be otherwise flowing along with the off gas to completely evaporate. It should be appreciated that the off gas is heated sufficiently to inhibit the temperature of the off gas reaching the burner from decreasing to less than the dew point, even when the off gas radiates heat to ambient air while the off gas is flowing toward the burner.

Hereinafter, embodiments of the present invention will be described with reference to the drawings.

Embodiment 1

Figure 1:
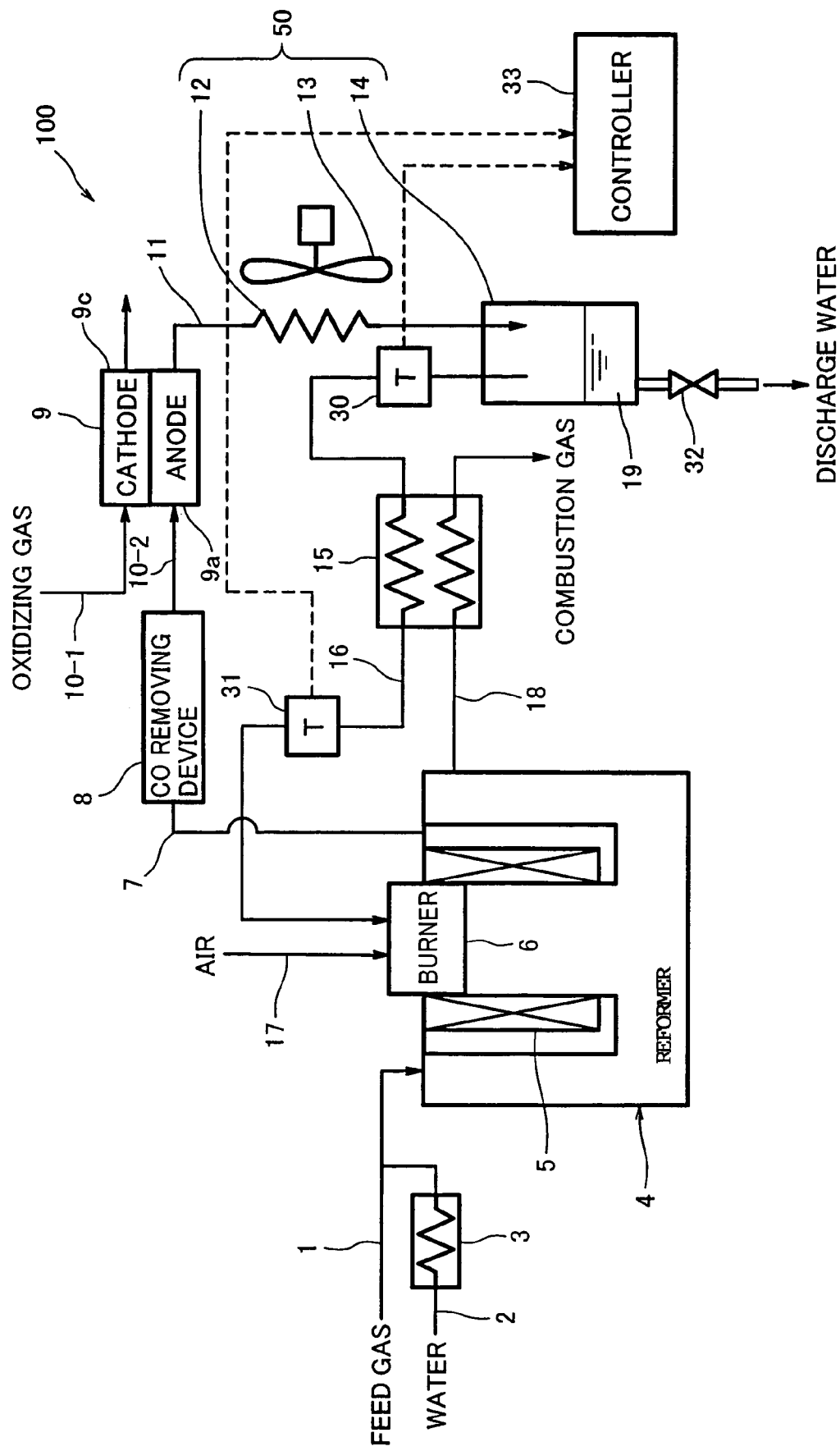
FIG. 1 is a block diagram showing a construction of a fuel cell power generation system according to a first embodiment of the present invention.

FIG. 1 is a block diagram showing a construction of a fuel cell power generation system 100 according to a first embodiment of the present invention. The supply system of a reformed gas and an oxidizing gas in the fuel cell power generation system 100 mainly comprises a reformer 4 having a reforming catalyst body 5 configured to generate the reformed gas containing hydrogen through a reforming reaction using a feed gas (city gas) and steam, a city gas feed pipe 1 as a material feed portion configured to feed the city gas to the reformer 4, a water supply pipe 2 as a water supply portion configured to supply water to the reformer 4, an evaporator 3 configured to evaporate the water flowing within the water supply pipe 2, a burner 6 configured to combust a gas mixture including air guided through an air supply pipe 17 and an off gas (to be described later) to generate the combustion gas used for heating the reforming catalyst body 5, a reformed gas pipe 7 through which the reformed gas generated by the reformer 4 is guided to a downstream side in a flow of the reformed gas, a CO removing device 8 configured to remove carbon monoxide (CO) contained in the reformed gas sent from the reformer 4, a fuel cell 9 configured to generate electric power in such a manner that an oxidizing gas (air) is consumed in a cathode 9c and the reformed gas (hydrogen) is consumed in an anode 9a, an air supply pipe 10-1 through which the oxidizing gas is guided from an oxidizing gas supply source (not shown) to the cathode 9c of the fuel cell 9, and a reformed gas supply pipe 10-2 through which the reformed gas is guided from the CO removing device 8 to the anode 9a of the fuel cell 9.

An off gas treatment system in the fuel cell power generation system 100 mainly comprises an off gas pipe 11 through which hydrogen remaining unconsumed within the fuel cell 9 and having a temperature of about 70 to 80° C. is guided from the anode 9a to a downstream side in a flow of the off gas, a cooler (off-gas cooling heat exchanger) 12 connected to the off gas pipe 11 and configured to cool the off gas to lower its temperature by heat exchange with air (cooling medium) blown from an air-cooling fan 13, a tank 14 configured to condense steam residing in the off gas, to store the resulting condensed water 19, and to discharge the condensed water 19 to outside the tank 14 by opening a discharge valve 32, a fuel pipe 16 through which the off gas is guided from the tank 14 to the burner 6, a combustion gas pipe 18 through which the combustion gas generated by the burner 6 is guided from the reformer 4 to outside, a heater (off-gas heating heat exchanger) 15 connected to the fuel pipe 16 and to the combustion gas pipe 18 and configured to heat the off gas flowing within the fuel pipe 16 by heat exchange with the combustion gas flowing within the combustion gas pipe 18, a first sensor 30 configured to measure the temperature of the off gas at a point located upstream of the heater 15 and downstream of the tank 14 (in the vicinity of an exit), a second sensor 31 configured to measure the temperature of the off gas which has passed through the heater 15 and is flowing toward the burner 6, and a controller 33 configured to control the flow rate of the off gas or the combustion gas based on the temperatures detected by the first and second sensors 30 and 31 by using a flow rate adjusting valve (not shown). Although not shown, the controller 33 is configured to appropriately control the operation of the fuel cell power generation system 100 based on predetermined detected signals indicating, for example, a gas temperature or gas flow rate.

A water separator 50 is configured to separate steam from the off gas containing hydrogen from the fuel cell 9 and to condense the separated steam to discharge the resulting water to the outside. The water separator 50 includes the cooler 12, the air-cooling fan 13, and the tank 14.

The cooler 12 (e.g., a pipe or the like within which the off gas flows) connected to the off gas pipe 11 is cooled by the air blown from the air-cooling fan 13. By heat exchange with the air, the off gas flowing within the cooler 12 is cooled to a lowered temperature. Since the cooler 12 facilitates heat radiation from the off gas, the temperature of the off gas quickly decreases to a predetermined value. After the steam contained in the off gas condenses to form water droplets within the off gas, these water droplets gather and are stored in the tank 14 as the condensed water 19.

Hereinafter, the operation of the off gas treatment system of the fuel cell power generation system 100 constructed as described above will be described with reference to FIG. 1. Since power generation in the fuel cell 9 and gas supply to the fuel cell 9 are carried out by an existing technique, description of these is omitted.

The off gas having a temperature of about 70 to 80° C. is sent from the anode 9a of the fuel cell 9. The off gas contains hydrogen remaining unconsumed after the reaction in the fuel cell 9, carbon dioxide resulting from hydrogen generation in the reformer 4, saturated steam, etc.

The off gas flows through the off gas pipe 11 and is supplied to the cooler 12, where the off gas is cooled to a temperature of about 50 to 60° C. by heat exchange with air blown from the air-cooling fan 13. At this time, the steam residing in the off gas condenses and is liquefied. Thus, the condensed water 19 obtained by separating the steam from the off gas is stored in the tank 14. The off gas existing in the vicinity of the exit of the tank 14, from which the steam has been removed, contains saturated steam having a temperature of about 50 to 60° C.

Thereafter, the off gas is supplied to the heater 15, where the off gas is heated to a temperature of about 80 to 90° C. by heat exchange with the high-temperature combustion gas flowing through the combustion gas pipe 18. As a result, the temperature of the off gas becomes sufficiently higher than the dew point (about 50 to 60° C.). The off gas in such a state is supplied to the burner 6 through the fuel pipe 16.

The first sensor 30 detects the temperature of the off gas existing in the vicinity of the exit of the tank 14, while the second sensor 31 detects the temperature of the off gas which has passed through the heater 15 and is flowing toward the burner 6. The controller 33 monitors these detected temperatures and performs control operations, so that proper temperatures are maintained. For example, when the temperature of the heated off gas that has passed through the heater 15 varies for some reason (e.g., variation in the temperature or flow rate of the off gas and/or the combustion gas), the controller 33 properly controls the flow rate of the off gas and/or the combustion gas, so that the temperature of the off gas quickly reaches a target value.

The off gas is guided to the inside of the burner 6 and mixed with the air flowing into the burner 6 through the air supply pipe 17. The resulting gas mixture combusts within the burner 6 to generate a high-temperature combustion gas. Then, the combustion gas heats the reforming catalyst body 5 by heat exchange and flows through the combustion gas pipe 18. The combustion gas is used to heat the off gas in the heater 15 as described above and is thereafter discharged to atmosphere.

Figure 6:
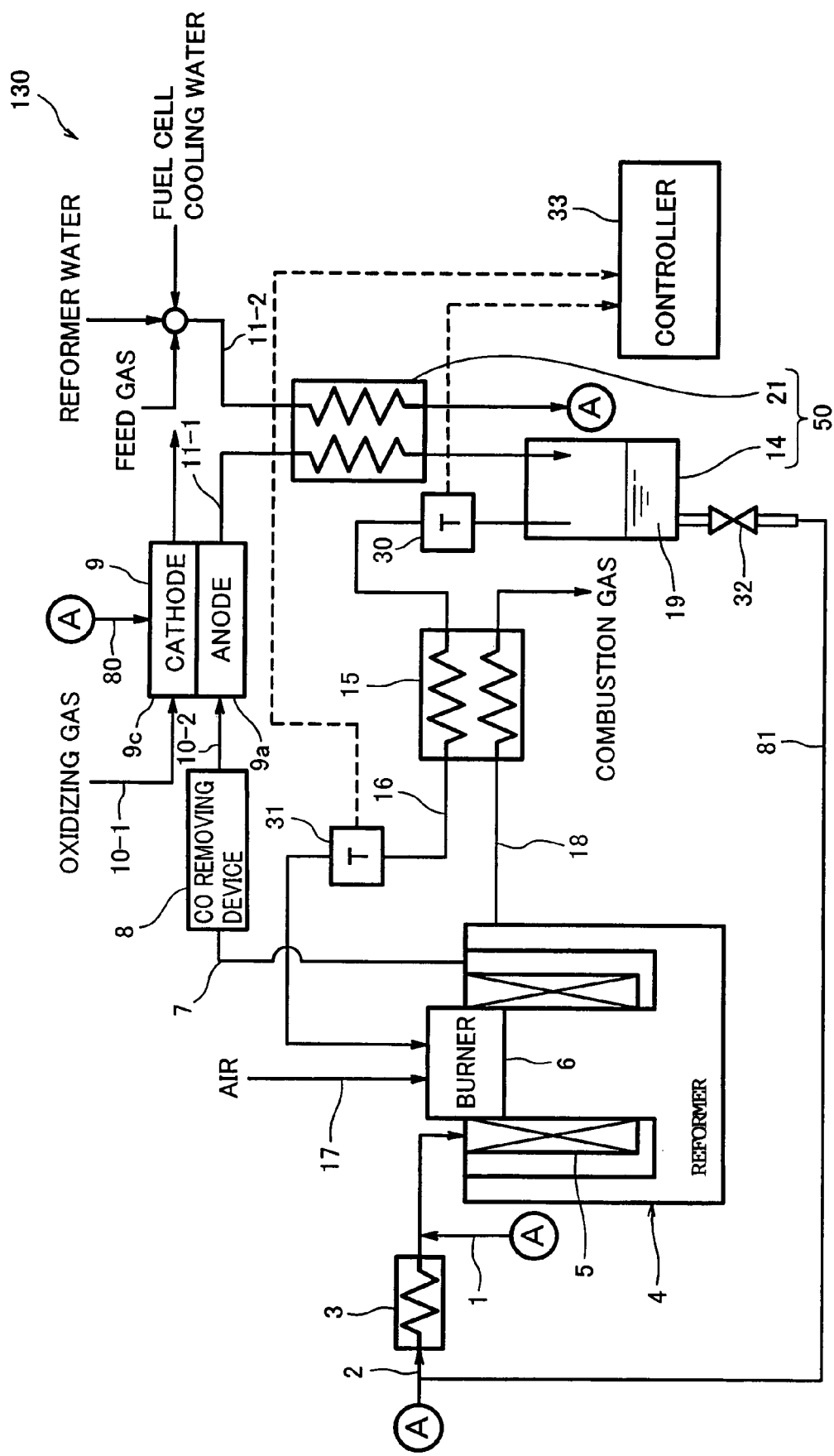
FIG. 6 is a block diagram showing a construction of a fuel cell power generation system according to a fourth embodiment of the present invention.

It should be appreciated that the condensed water 19 stored in the tank 14 may be used as water to be supplied to the reformer 4 (see FIG. 6).

In accordance with the operation of the off gas treatment system of the above described fuel cell power generation system 100, since the off gas, from which the steam has been appropriately separated by the water separator 50, is heated by heat exchange in the heater 15, it is possible to reliably evaporate the water droplets flowing along with the off gas.

Further, by heating the off gas to a temperature sufficiently higher than the dew point, it is possible to inhibit the temperature of the off gas, which has passed through the heater 15 and is being guided toward the burner 6 through the fuel pipe 16, from decreasing to less than the dew point, even when the off gas radiates heat to the ambient surrounding the fuel pipe 16.

In this manner, the fuel cell power generation system 100 can appropriately deal with the prior art problem that the water droplets flowing along with the off gas cause unstable combustion of the fuel gas in the burner 6.

The temperature of the off gas which has passed through the heater 15 may vary depending on the construction of the system, although a temperature of about 80 to 90° C. has been illustrated in the first embodiment. The desired heating condition of the off gas is not intended to be limited to such a temperature range.

In brief, it is necessary to heat the off gas to inhibit the temperature of the off gas reaching the burner 6 from becoming lower than the dew point, due to heat radiation from the off gas. It should be remembered that it is necessary to heat the off gas, which has passed through the heater 15 and is flowing toward the burner 6, to a temperature at least higher than that of the off gas existing downstream of the tank 14 (in the vicinity of the exit).

Alternative Embodiment of Water Separator 50

Figure 2:
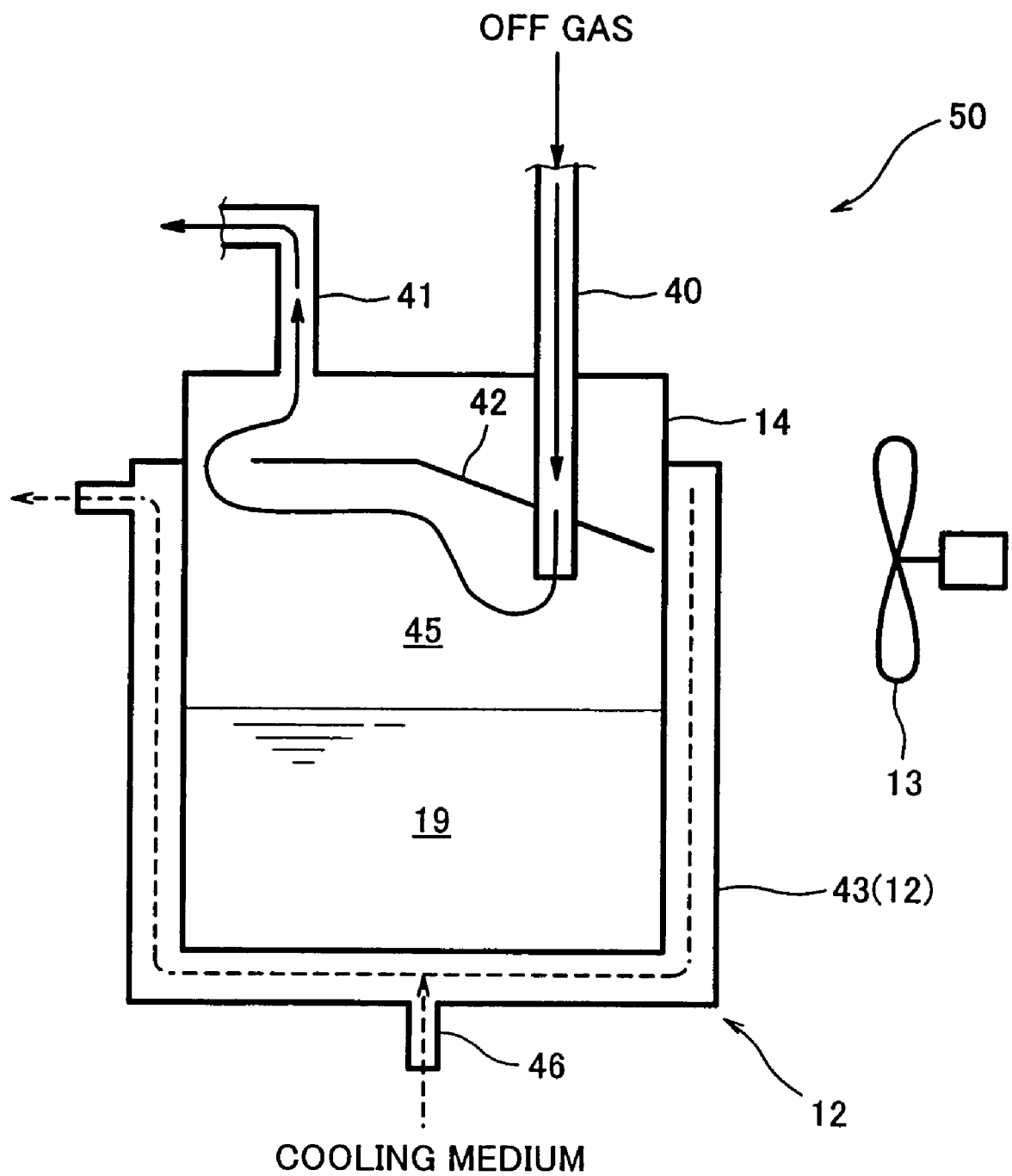
FIG. 2 is a cross-sectional view showing an embodiment of an internal construction of a water separator.
Figure 3:
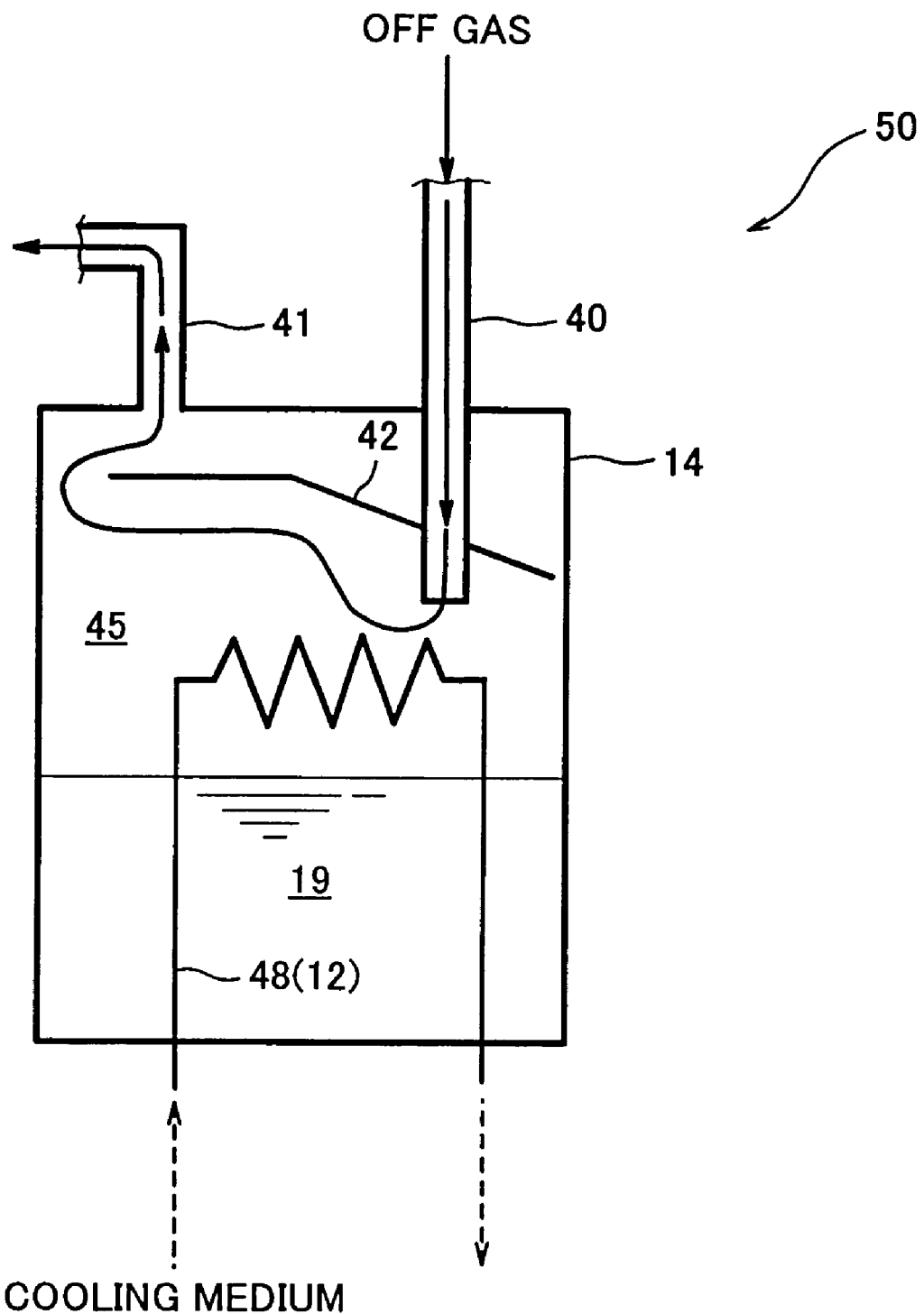
FIG. 3 is a cross-sectional view showing another embodiment of the internal construction of the water separator.

As shown in FIG. 1, the cooler 12 using the air-cooling fan 13 and the tank 14 may be considered as a unit and provided separately. As an alternative embodiment, as shown in FIGS. 2 and 3, an off-gas cooling heat exchanger corresponding to the cooler 12 in FIG. 1 may be integrally connected to the tank 14. This simplifies the construction of the water separator 50 in the fuel cell power generation system 100.

FIGS. 2 and 3 are cross-sectional views each showing the internal construction of the water separator 50 including the tank 14 to which the heat exchanger 12 is connected.

As shown in FIG. 2, the water separator 50 comprises the tubular tank 14 having a lid portion and a bottom portion, and configured to store the condensed water 19 obtained by separating steam from the off gas, an off gas inlet pipe 40 provided in the lid portion of the tank 14 and connected to the off gas pipe 11 (see FIG. 1) to guide the off gas to inside the tank 14, an off gas outlet pipe 41 provided in the lid portion of the tank 14 and connected to the fuel gas pipe 16 (see FIG. 1) to guide the off gas that has passed through the inside of the tank 14 to outside, a baffle plate 42 disposed within the tank 14 in the vicinity of the off gas inlet and outlet pipes 40 and 41 and configured to baffle the flow of the off gas to reduce the flow speed of the off gas to allow water droplets contained in the off gas to easily fall, and a water outlet pipe (not shown) provided in a bottom portion of the tank 14 and connected to the discharge valve 32 (see FIG. 1) to guide the condensed water 19 stored within the tank 14 to outside on a regular basis.

In the interior of substantially the upper-half portion of the tank 14, a passage region 45 is formed through which the off gas flows within the tank 14.

A cooling medium passage (off-gas cooling heat exchanger) 43 is disposed along an outer peripheral surface of the tank 14 to form a space within which a cooling medium (liquid or gas) being guided through a cooling medium inlet 46 flows along the outer peripheral surface. In this construction the off gas flowing within the passage region 45 makes contact with the outer peripheral surface of the tank 14 which is cooled by the cooling medium flowing within the cooling medium passage 43, thereby causing the temperature of the off gas to decrease. That is, the off gas is cooled by heat exchange with the cooling medium flowing within the cooling medium passage 43.

In addition to heat exchange with the cooling medium within the cooling medium passage 43, as shown in FIG. 2, heat exchange may be conducted using air (cooling medium) blown from the air-cooling fan 13 toward the outer peripheral surface of the tank 14, so that the off gas is quickly cooled to a lower temperature.

Since the cooling medium passage 43 facilitates heat radiation from the off gas, the temperature of the off gas quickly decreases to a predetermined temperature, thereby causing steam contained in the off gas to condense within the off gas. The resulting water droplets gather and are stored in the tank 14 as the condensed water 19.

In a further alternative embodiment of the water separator 50, as shown in FIG. 3, a pipe (off-gas cooling heat exchange ) 48 filled with a cooling medium extends from outside into the passage region 45 within the tank 14 and further from the passage region 45 to outside. That is, the pipe 48 is substantially U-shaped. In this construction the off gas flowing within the passage region 45 makes contact with the pipe 48, through which the cooling medium is flowing, and is thereby cooled by heat change with the cooling medium. The construction of the water separator 50 in FIG. 3, other than the pipe 48, is identical to that of the water separator 50 in FIG. 2, and will not be further described.

Embodiment 2

Figures 4A, 4B:
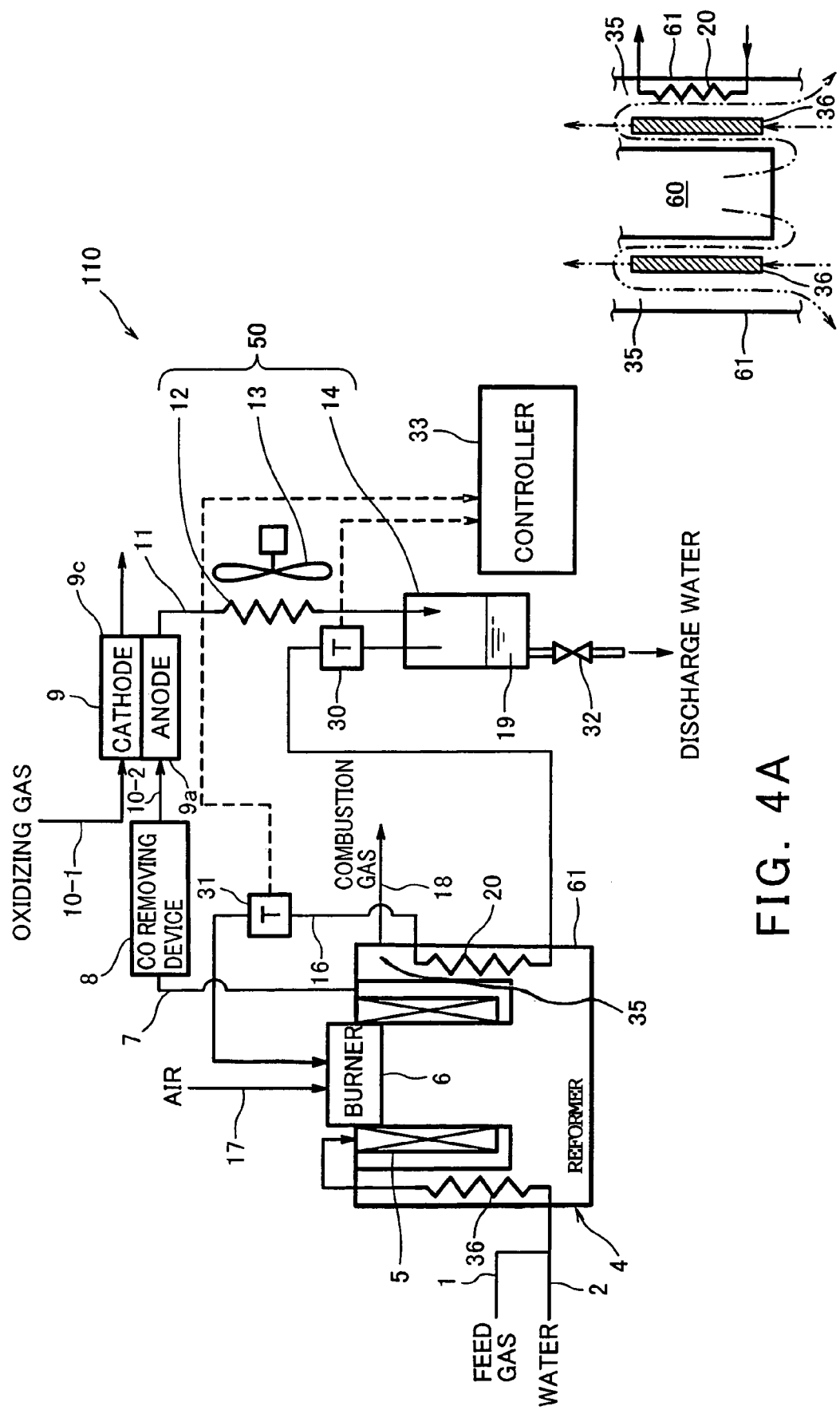
FIGS. 4A and 4B are block diagrams showing a construction of a fuel cell power generation system according to a second embodiment of the present invention.

FIGS. 4A and 4B are block diagrams showing the construction of a fuel cell power generation system 110 according to a second embodiment of the present invention. In FIGS. 4A and 4B the same reference numerals as those in FIG. 1 denote the same or corresponding parts.

Referring to FIG. 1 and FIG. 4A, the construction of the fuel cell power generation system 110 according to the second embodiment differs from that of the fuel cell power generation system 100 according to the first embodiment in that, in the system 110, a tubular evaporator 36 and a heater 20 serving as a feed pipe through which the off gas is fed to the burner 6 are both disposed in an annular combustion gas flow passage 35 of the reformer 4. By disposing the evaporator 36 in the combustion gas flow passage 35 of the reformer 4, thermal efficiency in the fuel cell power generation system 110 increases. Also, by disposing the heater 20 in the combustion gas flow passage 35 of the reformer 4, the construction of the heater 20 is simplified.

Referring to FIG. 4B, the construction of the evaporator 36 and the heater 20 will be described. The other construction is identical to that of the first embodiment and will not be described. FIG. 4B is a schematic view showing the construction of the evaporator 36 and the heater 20 in the combustion gas flow passage 35 of the reformer 4 according to the second embodiment of the present invention.

A tubular combustion chamber 60 is disposed inside the reformer 4 and defined by an outer wall 61 and connected to the burner 6 (see FIG. 4(A)) to guide the combustion gas generated by the burner 6 to a downstream side in the flow of the combustion gas. Thereby, the combustion gas flow passage 35 is formed between the combustion chamber 60 and the outer wall 61. The tubular evaporator 36 is disposed in the vicinity of an outer peripheral surface of the combustion chamber 60, while a part of the heater 20 is disposed to extend into and through the inside of the combustion gas flow passage 35. A connecting portion between the heater 20 and the outer wall 61 is sealed by appropriate means to inhibit leakage of the combustion gas.

As indicated by the two-dotted lines in FIG. 4B, within the combustion gas flow passage 35, the combustion gas flowing out from the combustion chamber 60 flows within an annular space between the combustion chamber 60 and the evaporator 36. Then, the combustion gas changes direction 180 degrees and flows through an annular space between the evaporator 36 and the outer wall 61 to be guided to the combustion gas pipe 18.

In this construction, while the combustion gas is flowing within the combustion gas flow passage 35, water (to be precise, a mixture of the city gas flowing through the city gas feed pipe 1 and the water flowing through the water supply pipe 2) flowing within the evaporator 36, as indicated by a dashed vertical line in FIG. 4B, is heated by heat exchange with the combustion gas, and the off gas flowing through the heater 20, as indicated by a solid arrow line in FIG. 4B, is heated by heat exchange with the combustion gas.

Embodiment 3

Figures 5A, 5B:
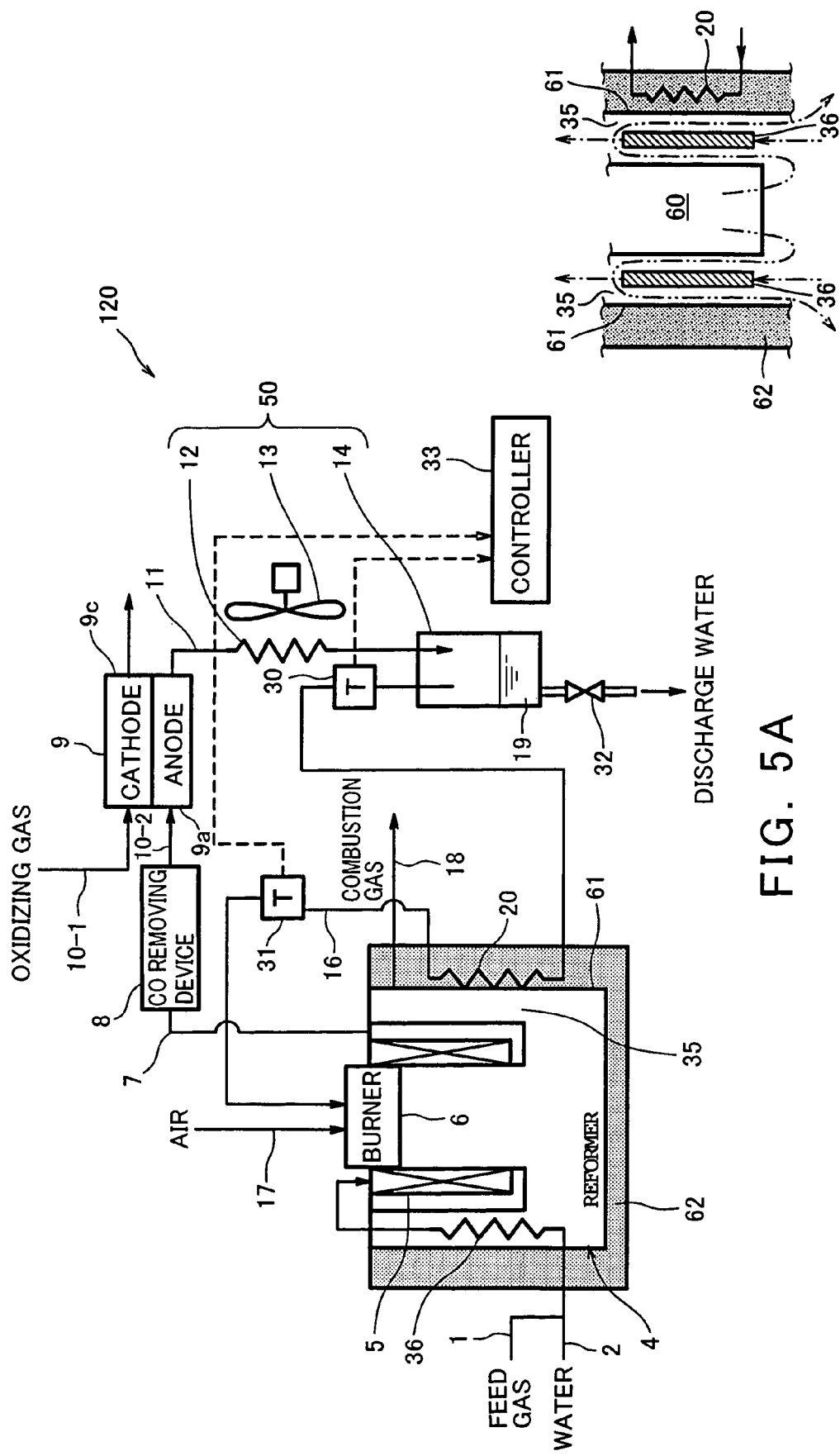
FIGS. 5A and 5B are block diagrams showing a construction of a fuel cell power generation system according to a third embodiment of the present invention.

FIGS. 5A and 5B are block diagrams showing the construction of a fuel cell power generation system 120 according to a third embodiment of the present invention. In FIGS. 5A and 5B the same reference numerals as those in FIGS. 4A and 4B denote the same or corresponding parts.

Referring to FIGS. 5A and 5B and 4A and 4B, the construction of the fuel cell power generation system 120 according to the third embodiment differs from that of the fuel cell power generation system 110 according to the second embodiment in that, in the system 120 a heat insulator 62 is disposed to enclose the outer wall 61 of the reformer 4, and the heater 20 is disposed within the heat insulator 62 to form a feed pipe through which the off gas is fed to the burner 6. To be precise, the heat insulator 62 is provided with a concave portion in which the heater 20 is located, and the heater 20 is covered with another heat insulator. By providing the heat insulator 62, heat radiation from the combustion gas flowing through the combustion gas flow passage 35 of the reformer 4 is appropriately inhibited. By a simple construction in which the heater 20 is disposed within the heat insulator 62, heat exchange between the off gas and the combustion gas can be carried out. That is, it is possible to dispose the heater 20 within the heat insulator 62 without sealing a connecting portion between the heater 20 and the heat insulator 62.

Referring to FIG. 5B, the construction of the evaporator 36 and the heater 20 will be described. FIG. 5B is a schematic view showing the construction of the evaporator 36 and the heater 20 in the combustion gas flow passage 35 of the reformer 4 according to the third embodiment of the present invention.

As in the second embodiment, the annular combustion gas flow passage 35 is formed between the combustion chamber 60 and the outer wall 61 of the reformer 4. The heat insulator 62 is disposed in contact with the outer wall 61 so as to cover the outer wall 61, and part of the heater 20 extends into and through the inside the heat insulator 62. Also, as in the second embodiment, the tubular evaporator 36 is disposed in the vicinity of the outer peripheral surface of the combustion chamber 60.

As indicated by the two-dotted line in FIG. 5B, within the combustion gas flow passage 35, the combustion gas flowing out from the combustion chamber 60 flows within an annular space between the combustion chamber 60 and the evaporator 36. Then, the combustion gas changes direction 180 degrees and flows through an annular space between the evaporator 36 and the outer wall 61 to be guided to the combustion gas pipe 18.

In this construction, while the combustion gas is flowing within the combustion gas flow passage 35, water (to be precise, a mixture of the city gas flowing through the city gas feed pipe 1 and the water flowing through the water supply pipe 2) flowing within the evaporator 36, as indicated by a dashed vertical line in FIG. 5B, is heated by heat exchange with the combustion gas, and the off gas flowing through the heater 20, as indicated by the solid arrow line in FIG. 5B, is heated by heat exchange with the combustion gas.

Embodiment 4

FIG. 6 is a block diagram showing the construction of a fuel cell power generation system 130 according to a fourth embodiment. In FIG. 6 the same reference numerals as those in FIG. 1 denote the same or corresponding parts.

Referring to FIGS. 1 and 6, the construction of the fuel cell power generation system 130 according to the fourth embodiment differs from the construction of the fuel cell power generation system 100 according to the first embodiment in that the system 130 is equipped with a cooler (off-gas cooling heat exchanger) 21 connected to an off gas passage 11-1 through which the off gas flows and a cooling medium passage 11-2 through which a cooling medium flows, without providing the air-cooling fan 13, and in the system 130, the discharge pipe 32 is connected to the evaporator 3. The water separator 50 configured to separate the steam from the off gas containing hydrogen sent from the fuel cell 9 and to condense the separated steam into water to be discharged outside includes the cooler 21 and the tank 14.

Because of the absence of the air-cooling fan 13, the number of components can be reduced. Instead, the off gas flowing through the off gas passage 11-1 is cooled by heat exchange with a cooling medium flowing through the cooling medium passage 11-2 within the cooler 21. The rest of the construction is identical to that of the first embodiment, and will not be further described.

As shown in FIG. 6, by connecting a portion of the cooling medium passage 11-2, which extends from the cooler 21 to a downstream side, to the water supply pipe 2, the water to be supplied to the reformer 4 can be used as the cooling medium.

Further, by connecting a portion of the cooling medium passage 11-2, which extends from the cooler 21 to a downstream side, to the city gas feed pipe 1, the city gas (feed gas) to be fed to the reformer 4 can be used as the cooling medium.

Also, by connecting a portion of the cooling medium passage 11-2, which extends from the cooler 21 to a downstream side, to a fuel cell cooling water pipe 80, cooling water to be supplied to the fuel cell 9 can be used as the cooling medium.

Still further, as a cooling medium flowing through the cooling medium passage 43 or the pipe 48 of the tank 14 shown in FIG. 2 or 3, the water to be supplied to the reformer 4, the feed gas to be fed to the reformer 4, or the cooling water to be supplied to the fuel cell 9 can be used.

Moreover, as shown in FIG. 6, by connecting the discharge valve 32 to the water supply pipe 2 through a water circulating pipe 81, the condensed water 19 stored in the tank 14 returns to the evaporator 3 through the water circulating pipe 81. Thereby, the condensed water 19 obtained by removing the steam from the off gas can be re-used as the water to be supplied to the reforming catalyst body 5.

Embodiment 5

Figure 7:
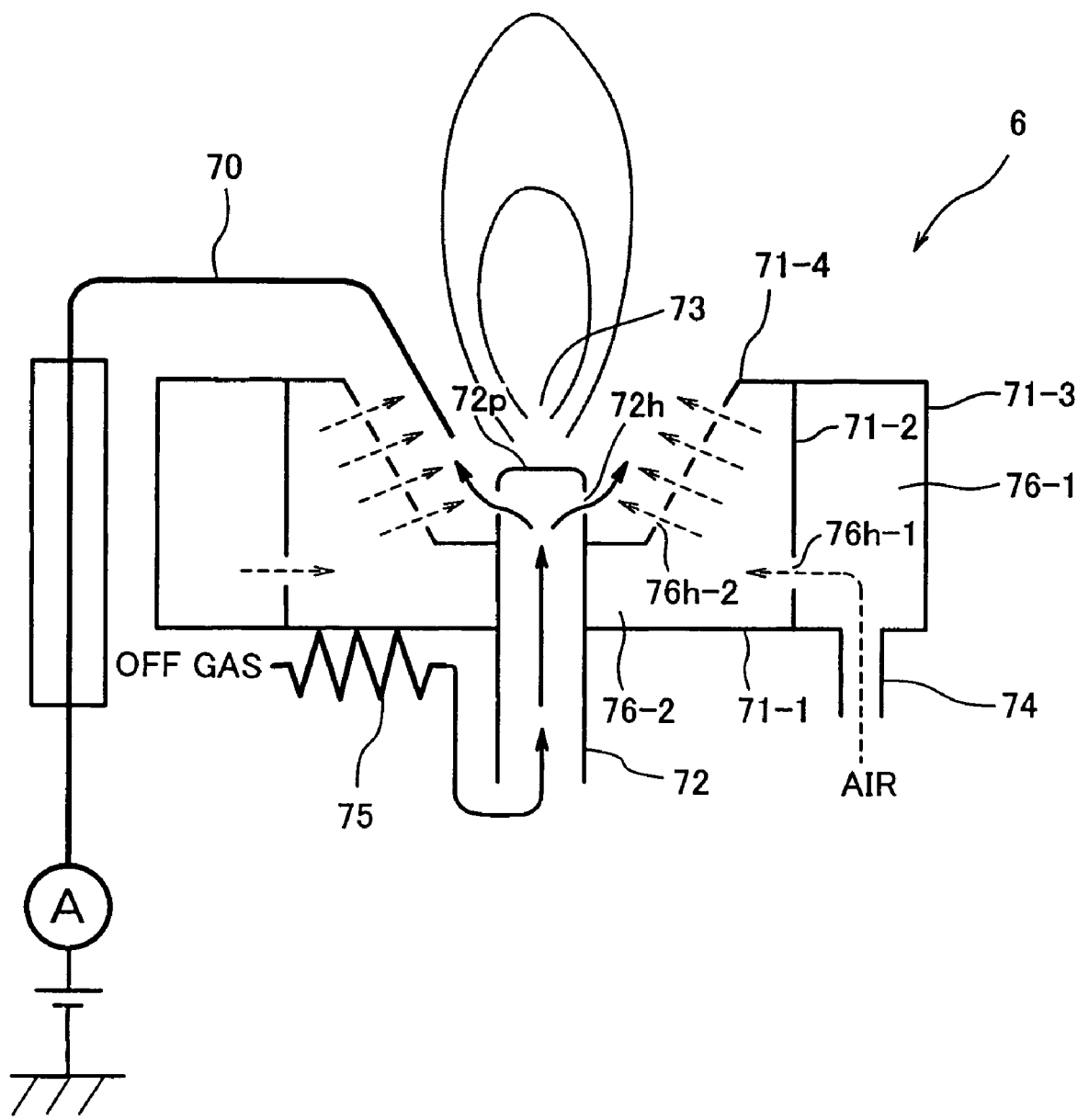
FIG. 7 is a side elevation view showing a construction of a burner according to a fifth embodiment of the present invention.

As shown in FIG. 7, a heater 75 is disposed in contact with a wall portion forming the burner 6. The heater 75 functions as a feed pipe through which the off gas is fed to the burner 6. In the construction in FIG. 7, the heater 75 replaces the heater 15 in FIG. 1, which is connected to the fuel gas pipe 16 and to the combustion gas pipe 18.

The internal construction of the burner 6 will be described with reference to FIG. 7. The rest of the construction is identical to that of the first embodiment, and therefore, will not be described.

The burner 6 mainly comprises a burner fuel pipe 72 connected to an off gas pipe extending through the heater 75 and configured to guide the off gas to a flame region 73, air buffers 76-1 and 76-2 formed by a plurality of wall portions 71-1, 71-2, 71-3, and 71-4, and configured to guide air to the flame region 73, a burner air pipe 74 connecting the air supply pipe 17 (see FIG. 1) to the air buffer 76-1 and configured to guide the air to the air buffer 76-1, and a flame rod 70 configured to detect the combustion state of a gas mixture containing the air and the off gas. The buffer 76-1 is tubular and the air buffer 76-2 is annular and provided with a concave portion at a center region thereof.

A lid 72p is attached to a downstream end of the burner fuel pipe 72 in the flow of the off gas, so as to block the flow of the off gas. A plurality of injection holes 72h are arranged on a side wall of the burner fuel pipe 72 in the vicinity of the lid 72p to be equally spaced apart from one another in a circumferential direction of the pipe 72. Thereby, as indicated by the solid arrows in FIG. 7, the off gas moving upward inside the burner fuel pipe 72 is blocked by the lid 72p, and injected evenly from the injection holes 72h toward the flame region 73.

The air buffer 76-1 and the air buffer 76-2 communicate with each other through injection holes 76h-1 arranged on the tubular wall portion 71-2 to be equally spaced apart in the circumferential direction. A plurality of injection holes 76h-2 are arranged on the concave portion of the air buffer 76-2 to be equally spaced apart from one another both in depth and circumferential directions thereof. In such a construction, as indicated by the dashed lines in FIG. 7, the air flowing from the air buffer 76-1 to the air buffer 76-2 through the injection holes 76h-1 is injected evenly from the injection holes 76h-2 toward the flame region 73.

Thus, the off gas and the air are mixed with each other in the flame region 73. Then, the gas mixture combusts in the flame region 73 to generate a high-temperature combustion gas The combustion state of the gas mixture is detected by the flame rod 70. Based on a detection signal output from the flame rod 70, a controller 33 (see FIG. 1) properly controls combustion of the gas mixture in the flame region 73.

As shown in FIG. 7, the heater 75 is disposed in contact with the wall portion 71-1 forming lower walls of the air buffers 76-1 and 76-2 of the burner 6. In this structure, part of the heat generated in the flame region 73 is transmitted to heat the wall portion 71-1, and thereby, the off gas flowing through the heater 20 is heated by heat exchange with the wall portion 71-1.

In the above construction, the off gas which has passed through the heater 75 and is flowing toward the burner 6 has a temperature sufficiently higher than the dew point. Therefore, the off gas from which the water droplets flowing along with the off gas have been reliably evaporated by the heater 75, is supplied to the flame region 73 of the burner 6. Consequently, it is possible to avoid the prior art problem that combustion of the off gas in the flame region 73 of the burner 6 becomes unstable due to such water droplets.

The flame rod 70 serves to detect the carbon ion current flowing within the flame by application of a voltage to the flame and to thereby judge the combustion state of the fuel gas in the flame region 73 of the burner 6. However, the off gas as a fuel gas contains a large quantity of hydrogen, and hydrogen ions are more plentiful and carbon ions are less plentiful in combustion of the off gas than in combustion of the city gas or the like. Under this condition, the precision with which the flame rod 70 detects the carbon ion current is low. Under the circumstances, unless the water droplets in the off gas are reliably evaporated by the heater 75, the precision with which the flame rod 70 detects the carbon ion current becomes lower.

Accordingly, in accordance with the fifth embodiment, the water droplets contained in the off gas can be reliably removed before the off gas is fed to the burner 6. Thereby, the combustion of the off gas can be stabilized. In addition, it is possible to inhibit reduction in the precision with which the flame rod 70 detects the carbon ion current. As a matter of course, the effect of increasing detection precision in the flame rod 70 can be accomplished in the fuel cell power generation systems according to the first to fourth embodiments.

Numerous modifications and alternative embodiments of the invention will be apparent to those skilled in the art in the light of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

We claim:

1. A fuel cell power generation system comprising:
    a reforming catalyst body configured to generate a reformed gas containing hydrogen from a feed gas and water;
    a fuel cell configured to generate electric power by consuming the reformed gas, the fuel cell having a cathode and an anode, the cathode consuming an oxidizing gas and the anode consuming the reformed gas, the anode discharging an off gas containing hydrogen gas for discharging a combustion gas for heating the reforming catalyst body;
    an off gas water separator located downstream of the anode and configured to separate steam from the off gas containing hydrogen gas and to condense the separated steam into water which is discharged outside the system;
    an off gas heating heat exchanger located downstream of the off gas water separator and configured to heat the off gas containing hydrogen gas from the water separator by heat exchange with the combustion gas;
    a burner configured to combust the off gas heated by the off gas heating heat exchanger to generate the combustion gas used for heating the reforming catalyst body; and
    a fuel pipe through which the off gas is guided from the water separator to the burner, wherein the off gas heating heat exchanger is configured to heat the off gas flowing within the fuel pipe located downstream of the water separator.

2. The fuel cell power generation system according to claim 1, further comprising a temperature sensor and a controller responsive to the temperature sensor to insure that the off gas which has passed through the off gas heating heat exchanger and is flowing toward the burner is heated to a temperature higher than the temperature of the off gas existing at a point located upstream of the off gas heating heat exchanger and downstream of the water separator in a flow of the off gas.

3. A fuel cell power generation system comprising:
    a reforming catalyst body configured to generate a reformed gas containing hydrogen from a feed gas and water;
    a fuel cell configured to generate electric power by consuming the reformed gas, the fuel cell having a cathode and an anode, the cathode consuming an oxidizing gas and the anode consuming the reformed gas, the anode discharging an off gas containing hydrogen gas for discharging a combustion gas for heating the reforming catalyst body;
    an off gas water separator located downstream of the anode and configured to separate steam from the off gas containing hydrogen gas and to condense the separated steam into water which is discharged outside the system;
    an off gas heating heat exchanger located downstream of the off gas water separator and configured to heat the off gas containing hydrogen gas from the off gas water separator by heat exchange with the combustion gas; and
    an off gas cooling heat exchanger configured to cool the off gas containing hydrogen gas by heat exchange, such that the steam is separated by cooling the off gas in the off gas cooling heat exchanger.

4. The fuel cell power generation system according to claim 3, further comprising a cooling medium supply to the off gas cooling heat exchanger, such that the off gas is cooled by heat exchange with at least one cooling medium selected from the group consisting of the feed gas, the water, and fuel cell cooling water.

5. The fuel cell power generation system according to claim 3, wherein the water separator includes a tubular tank that stores condensed water obtained by separating steam from the off gas, and the off gas cooling heat exchanger is in heat exchange contact with an outer peripheral surface of the tank, such that the off gas flowing within the tank is cooled by contact with the peripheral surface.

6. The fuel cell power generation system according to claim 3, wherein the water separator includes a tubular tank that stores condensed water obtained by separating steam from the off gas, and the off gas cooling heat exchanger comprises a pipe filled with a cooling medium, the pipe being disposed in a passage within the tank through which the off gas flows.

7. The fuel cell power generation system according to claim 1, further comprising a feed pipe through which the off gas is fed to the burner being located within a passage through which the combustion gas generated by the burner flows to allow the off gas to exchange heat with the combustion gas within the passage.

8. The fuel cell power generation system according to claim 1, further comprising a heat insulator configured to cover a passage through which the combustion gas generated by the burner flows, and a feed pipe for the off gas located within the heat insulator to allow the off gas to exchange heat with the combustion gas within the heat insulator.

9. The fuel cell power generation system according to claim 1, further comprising a feed pipe for the off gas, the feed pipe being in contact with a wall portion forming the burner, such that the off gas exchanges heat with the combustion gas in an area where the feed pipe is in contact with the wall portion.

10. The fuel cell power generation system according to claim 1, further comprising a flame rod inserted into a flame region of the burner and configured to detect a combustion state of the fuel gas in the flame region.

11. The fuel cell power generation system according to claim 1, further comprising a water circulating pipe for supplying condensed water obtained by removing the steam from the off gas to the reforming catalyst body.

* * * * *